United States Patent
Ottowitz et al.

(10) Patent No.: US 6,378,490 B1
(45) Date of Patent: Apr. 30, 2002

(54) DIRECT INJECTION INTERNAL COMBUSTION ENGINE

(75) Inventors: Alfred Ottowitz, Reichertshofen; Thomas Rieger, Ingolstadt; Dietmar Wermuth, Gaimersheim; Thomas Schladt, Eitensheim; Murat Serifsoy, Ingolstadt; Rainer Wurms, Lenting; Georg Faltermeier, Wolnzach; Ralf Budack, Ingolstadt, all of (DE)

(73) Assignee: Audi AG (DE)

( * ) Notice: Subject to any disclaimer, the term of this patent is extended or adjusted under 35 U.S.C. 154(b) by 0 days.

(21) Appl. No.: 09/641,127

(22) Filed: Aug. 16, 2000

(51) Int. Cl.[7] .................................................. F02B 5/00
(52) U.S. Cl. ...................................... 123/305; 123/298
(58) Field of Search ................................. 123/305, 298, 123/301

(56) References Cited

U.S. PATENT DOCUMENTS

| | | | | |
|---|---|---|---|---|
| 4,920,937 A | * | 5/1990 | Sasaki et al. ............... | 123/305 |
| 5,127,379 A | * | 7/1992 | Kobayashi et al. ......... | 123/305 |
| 5,170,759 A | * | 12/1992 | Ito .............................. | 123/305 |
| 5,215,053 A | * | 6/1993 | Ito .............................. | 123/305 |

* cited by examiner

*Primary Examiner*—John Kwon
(74) *Attorney, Agent, or Firm*—Lalos & Keegan

(57) ABSTRACT

The invention relates to an internal combustion engine with direct fuel injection comprising at least two adjacent inlet valves (1) per cylinder, a number of outlet valves (2), an essentially coaxial spark plug (3), an injection valve (4) and a piston (5,5'). The aim of the inventive engine is to provide an improved mixture preparation which is characterized by low fuel consumption and low exhaust emissions. To this end, the injection valve (4) is arranged between two of the adjacent inlet valves (1) and the section of the cylinder wall adjacent to said inlet valves (1). in addition, the piston (5,5') has a longitudinally extended combustion chamber cavity (6), whereby the combustion chamber cavity (6) essentially extends along the front surface of the piston (5,5') in the direction of the vertical projection of an injection stream (E) exiting from the injection valve (4). Said cavity also comprises a step (7) which essentially runs in a transversal direction.

16 Claims, 11 Drawing Sheets

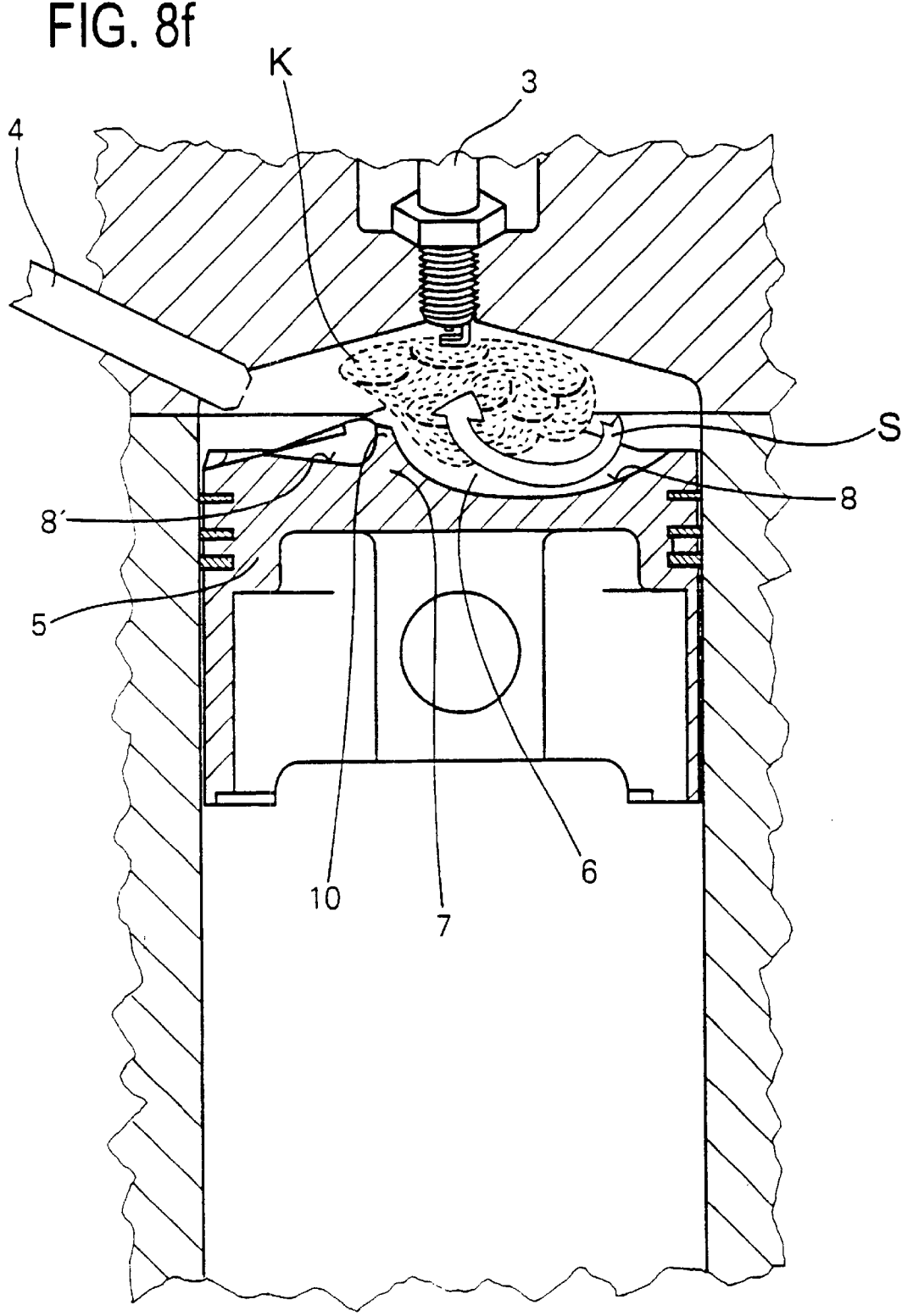

DIRECT INJECTION INTERNAL COMBUSTION ENGINE

Figure 1:
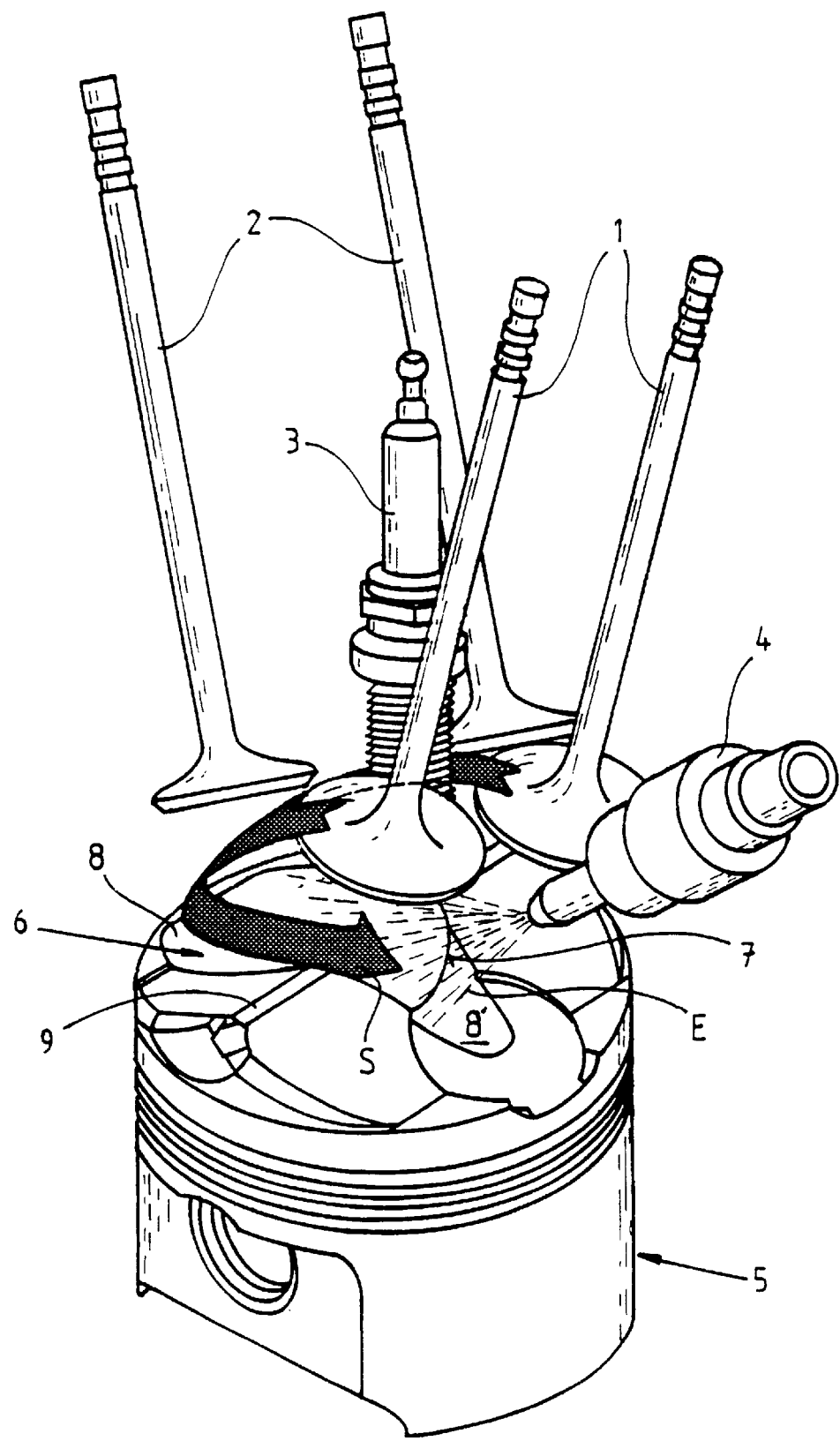

This invention relates to a direct injection internal combustion engine which has at least two intake valves per cylinder mounted side by side, a plurality of exhaust valves, a more or less coaxial spark plug, an injection valve, and a piston. The invention also relates to a process for mixture preparation in a direct injection internal combustion engine.

BACKGROUND OF INVENTION

An internal combustion engine and a process such as this are known, for example, from The Ford PROCO Engine Update," Scussel A. J. et al., SAE 780699. In this instance fuel is injected directly into a cylinder of an internal combustion engine by means of a high-pressure injection nozzle. However, the time required for preparation of a homogeneous lean mixture limits the injection time. On the other hand, in order to obtain a local area with a combustible fuel/air mixture, it is necessary to be only very late in introducing the fuel, something which creates problems in mixture formation.

SUMMARY OF INVENTION

In this context it is the object of this invention to design an improved direct injection internal combustion engine and a process of mixture preparation characterized in homogeneous lean fuel operation and in stratified lean fuel operation by low fuel consumption and by low exhaust emissions.

To attain this end the injection valve is mounted between two adjacent intake valves and the section of the cylinder wall adjoining these intake valves and the piston has an oblong combustion chamber trough, which extends more or less in the direction of the vertical projection of the injection stream emerging from the injection valve onto the face of the piston and has a step extending more or less crosswise. This step divides the combustion chamber trough into a first area remote from the injection valve guiding the flow of fresh air and an area near the injection valve guiding the injection stream, the first and the second areas being situated on different levels. Division into two areas results in especially efficient preparation of the mixture in the combustion chamber and in better combustion accompanied by low pollutant values. For this purpose the fresh air tumble flowing into the combustion chamber, which enters through the intake openings controlled by the adjacent intake valves and flows downward on the cylinder wall opposite intake openings toward the piston, and the fuel, which is injected through the injection valve early or late, depending on the operating condition of the internal combustion engine, is homogeneously mixed or, again, is prepared as a stratified charge, moves to the spark plug and is ignited there. In the case of homogeneous lean fuel operation the oblong combustion chamber trough with transverse step causes the fresh air tumble flowing into the combustion chamber to move through the first combustion chamber area far from the injection valve and to be deflected upward by the step so that the fuel injected into the combustion chamber opposite the tumble flow may be injected into the combustion chamber trough. And in stratified lean fuel operation the fuel injected by the injection valve in advance of the tumble flow may be injected into the second area of the combustion chamber upstream from the step near the injection valve. As soon as fuel particles reach the step, they are mixed thoroughly with the air flowing in the opposite direction, so that a homogeneous fuel mixture spray is generated near the step, while a distinct lean mixture is present in the rest of the combustion chamber. Subsequent compression movement of the piston then moves the fuel mixture spray to the spark plug, where it is ignited.

In accordance with an advantageous development of the invention, the intake valves should be spaced the maximum distance from each other to sustain the tumble flow of fresh air. This feature also favors mounting of the injection valve between the intake valves.

The injection valve should be mounted at an angle of approximately 30 to 80 degrees to the axis of the cylinder, so that the oblong combustion chamber trough up to the step can be reached by injected fuel. In addition, the injection valve may be bent at an angle causing the injection stream to be deflected in the direction desired so that the central axis of the injection stream is positioned at an angle of approximately 45 to 70 degrees to the axis of the cylinder. As a result of the inclination and/or bend of the injection valve the injection stream may be adjusted so that it is directed into the tumble flow at a first crankshaft angle for homogeneous lean fuel operation and in advance of the tumble flow in a second crankshaft angle area, so that optimum mixture preparation is achieved for both stages of operation.

The injection valve injects fuel into the cylinder for the sake of homogeneous lean fuel operation during the intake stroke at a crankshaft angle of approximately 440 to 280 degrees, depending on engine speed, before the piston reaches upper dead center, since in this way the fuel is drawn approximately into the center of the fresh air flow prevailing in the combustion chamber so that the fuel and the fresh air may be homogeneously mixed together.

And for stratified lean fuel operation the injection valve injects fuel into the cylinder during the compression stroke with the crankshaft at an angle of approximately 120 to 30 degrees, before the piston reaches upper dead center. Hence the fuel is injected for the most part in advance of the fresh air tumble flow, is stabilized by the fresh air flow within the area of the combustion chamber trough as an ignitable fuel charge spray, and lastly is transported to the spark plug. In the process the oblong combustion chamber trough with step extending crosswise serves to guide or concentrate the fresh air tumble flow and to stabilize the ignitable mixture spray formed from the flow. This process can be completed despite the relatively late injection time.

By preference the step which divides the combustion chamber trough into a first area remote from the injection valve and a second area near the injection valve takes place more or less below the spark plug. As a result the first area allows efficient guidance of the fresh air tumble flow and the centrally positioned second step favorable deflection of the fresh air flow, while the second area effects adequate stabilization of the fuel charge spray near the spark plug. By special preference the first area of the combustion chamber trough is designed to be deeper than the second area, since this feature facilitates deflection of the fresh air tumble flow by the step representing transition from the deep area to the shallow area. However, the first area of the combustion chamber trough may, of course, also be designed to be shallower than the second area. Lastly, each of the two areas of the combustion chamber trough may also be designed to incline at a slight angle toward the edge of the piston. This results in particularly gentle flow of fresh air into the first area and of fuel into the second area of the combustion chamber trough.

In accordance with a development of the invention the oblong combustion chamber trough widens in the direction of the injection stream. As a result, the fresh air tumble flow is concentrated or focused in the combustion chamber trough, and this facilitates thorough mixing of fresh air and fuel. Similarly, the first area of the combustion chamber trough may be wide, more or less parabolic, in shape, while the second area may be in the form of a narrow corridor. These shapes are optimally adapted to the fresh air flowing in through at least two intake valves and correspondingly to the fuel injected through the injection valve.

Additional optimization of mixture preparation in this direct injection internal combustion engine is achieved by forming on the step extending more or less crosswise in the oblong combustion chamber trough a fin which extends over the entire length of the step. The fresh air tumble flow is especially favorably guided and maintained for a prolonged period during compression and injection, and the fuel stream, which is injected more or less in a straight line, is deflected upward by the fin. These two factors result in very decidedly improved mixture preparation, so that a direct injection internal combustion engine characterized by markedly low fuel consumption and especially low exhaust gas emissions is created.

Further improvement is achieved if the fin is, for example, in the form of a sawtooth in cross-section, with the tip of the sawtooth fin pointing in the combustion chamber toward the intake valve or injection valve side. The fresh air in tumble flow is thus guided with highly favorable results over the curved back of the fin during compression and injection and as a result the flow is sustained for a prolonged period. In addition, the fuel stream injected more or less in a straight line is deflected distinctly upward by the tip of the fin. If the curved back of the sawtooth fin facing the exhaust valve side has a radius corresponding to approximately one-half the height of the fin relative to the second area of the combustion chamber trough, in the internal combustion engine claimed for the invention especially efficient coordination is achieved of the fresh air in tumble flow in the first area of the internal combustion engine with the fuel stream injected more or less in a straight line into the second area of the combustion chamber trough and deflected upward, since the fresh air in tumble flow distinctly supports transport of the fuel spray formed above the first area of the combustion chamber trough or above the fin toward the spark plug.

If the step with the fin is mounted at a distance of approximately ⅕ to ⅓ of the piston diameter from the more or less coaxial spark plug in vertical projection onto the face of the piston, the tip of the spark plug in the upper dead center of the piston behind the fin may be dipped into the first area of the combustion chamber trough.

Preferably the transition from the step with fin to the first area of the combustion chamber trough extends at an angle of approximately 2 to 30 degrees to the axis of the cylinder so as to ensure optimum deflection of the tumble flow at this point. And by special preference the surface of the step with fin is slightly concave on the side facing the first area of the combustion chamber trough, since the concavity of the step effects even more pronounced stabilization of the fresh air tumble flow in the first area of the combustion chamber trough. The suitably rounded or chamfered fin may be encompassed by the outline of the piston but may also project above the surface outline of the piston.

The first area of the combustion chamber trough near the step with fin is preferably wider than the fin. And by special preference the first area of the oblong combustion chamber trough near the plurality of exhaust valves is designed so that the disks of the exhaust valves in the upper dead center of the piston may be introduced into this area. This makes certain that the disks of the exhaust valves are not seated on the piston in the event of change in the valve control times.

It is expedient for the outlet opening of the injection stream to be positioned in the projection onto the face of the piston in advance of the fin and as far away as possible from the axis of the cylinder.

The object of the invention is also attained by a process of mixture preparation in a direct injection internal combustion engine as specified in claim 14.

In this process fresh air forms a tumble flow which enters the first area of the combustion chamber trough near the edge of the piston, is accelerated by the first area narrowing toward the center of the piston in the direction of flow, and finally is deflected in the direction of the spark plug by the step of the combustion chamber trough.

In addition, in stratified lean-fuel operation the tumble flow streams into the first area of the combustion chamber and during the compression stroke and injection is kept by the step above the first area of the combustion chamber trough.

In a development of the process, in stratified lean-fuel operation fuel from the injection valve is first injected in a straight line in the direction of the second area of the combustion chamber trough into the fresh air streaming as tumble flow through the first area of the combustion chamber trough and then is deflected by the step with fin in the direction of the spark plug, there being formed above the second area of the combustion chamber trough or above the fin in sawtooth form a fuel spray which, sustained by the fresh air tumble flow, is transported in the direction of the spark plug and is mixed with fresh air.

Lastly, the process claimed for the invention is to be carried out so that toward the end of the compression stroke a flow velocity of approximately 3 to 6 meters per second is maintained on the spark plug, so that favorable conditions for ignition of the fuel spray prevail in the combustion chamber.

BRIEF DESCRIPTION OF THE SEVERAL VIEWS OF DRAWINGS

Figure 3:
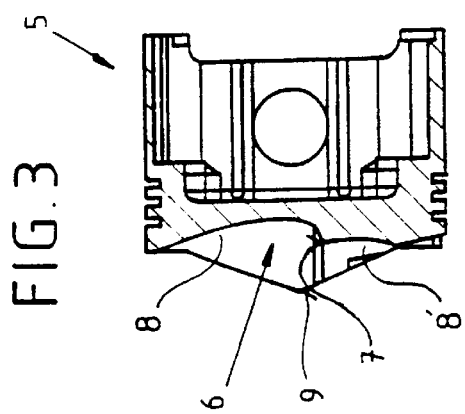
Figure 5:
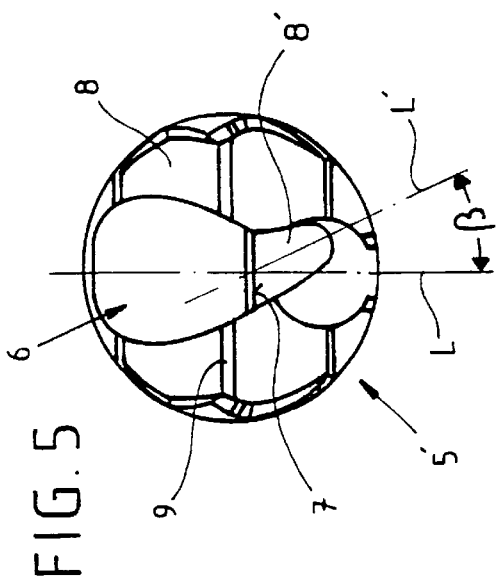
Figure 2:
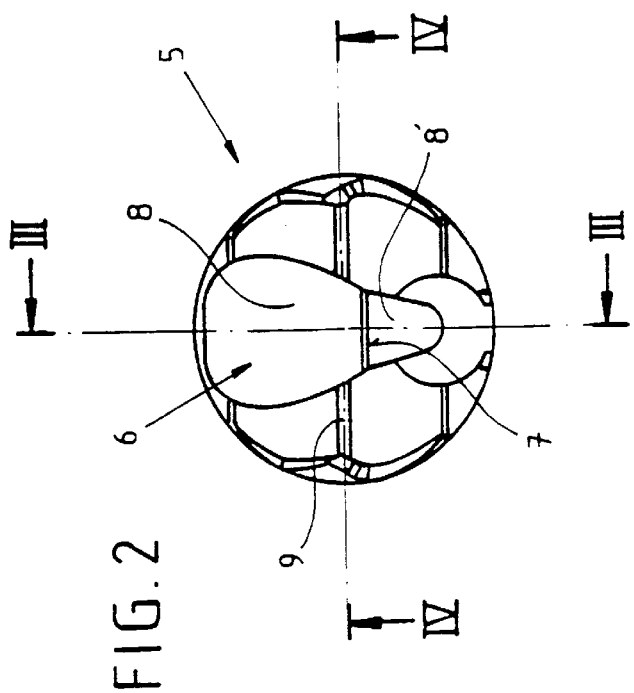
Figure 4:
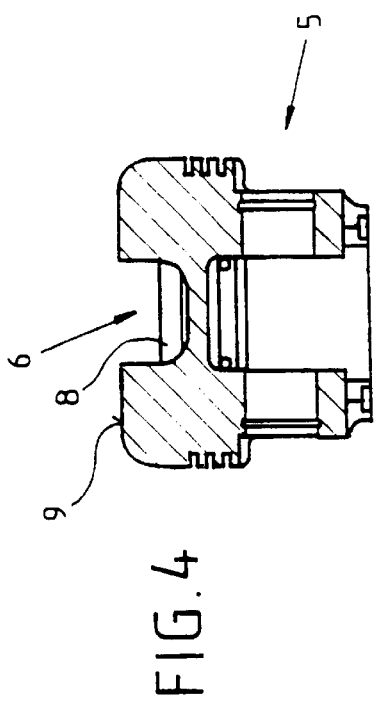
Figure 6:
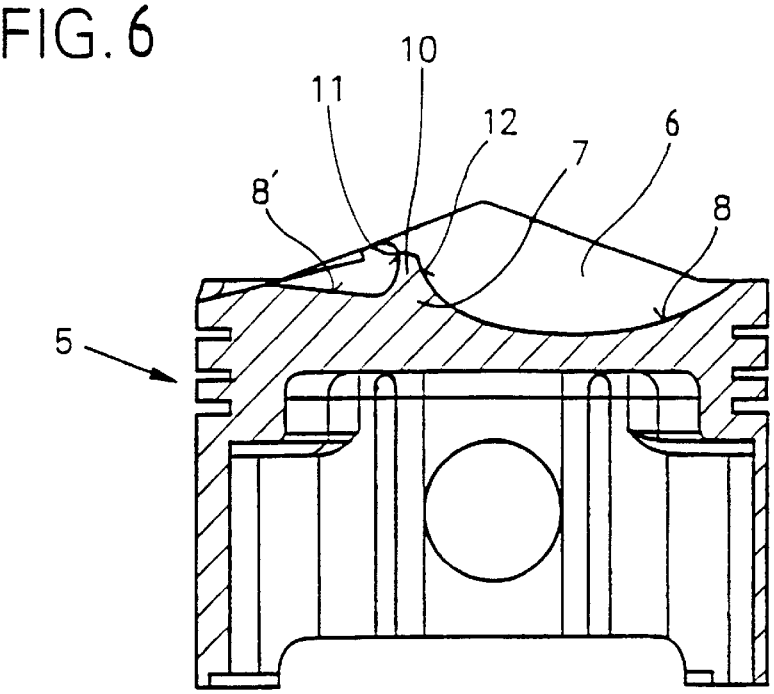
Figure 7:
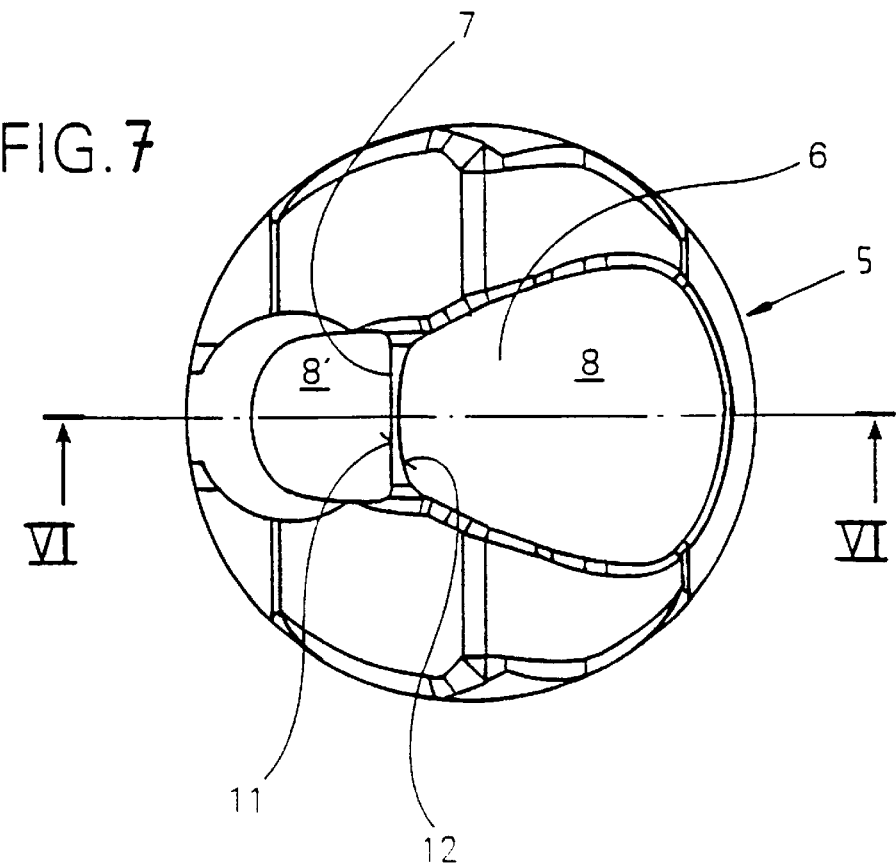

The invention is explained in detail below with reference to the following drawing figures, in which FIG. 1 is a simplified perspective view of the assembly of four gas breathing valves, spark plug, injection valve, and piston of a direct injection internal combustion engine;

FIG. 2 a top view of the piston shown in FIG. 1;

FIG. 3 a sectional view of the piston of FIG. 2 along line III—III;

FIG. 4 a sectional view of the piston of FIG. 2 along line IV—IV;

FIG. 5 a top view of another piston provided for a direct injection internal combustion engine;

FIG. 6 a section through a piston with a fin formed on it;

FIG. 7 a top view of the piston of FIG. 6; and

FIGS. 8a–8h each a section through the combustion chamber of the internal combustion engine at different crankshaft angles illustrative of the process of mixture preparation.

DETAILED DESCRIPTION OF A PREFERRED EMBODIMENT OF THE INVENTION

The internal combustion engine claimed for the invention as shown in FIG. 1 is provided with two intake valves 1 per cylinder mounted side by side. These two intake valves 1 are positioned on a side half of a cylinder not shown and two exhaust valves 2 also mounted side by side are positioned on the other side half of the cylinder. In addition, the internal combustion engine has a spark plug 3 mounted concentrically with the axis of the cylinder. One injection valve 4 is also provided per cylinder; this valve 4 is mounted between the two intake valves 1 and the section of the cylinder wall adjoining the two intake valves. The piston 5 mounted in the cylinder of the internal combustion engine has an oblong combustion chamber trough 6 with step 7 extending crosswise.

The fresh air flowing into the cylinder through the two intake valves 1 forms a tumble flow S inside the combustion chamber. Formation of the tumble flow S is enhanced if the two intake valves 1 are spaced the maximum distance from each other. This also facilitates positioning of the injection valve 4.

The two intake valves 1 are positioned parallel to each other and each is inclined at an angle to the spark plug 3 or to the axis of the cylinder. The two exhaust valves 2 are also situated parallel side by side and are mounted inclined at an angle to the axis of the cylinder in a direction other than that of the intake valves 1.

The injection valve 4 of the internal combustion engine is also mounted inclined at an angle to the axis of the cylinder, the angle of inclination α of the injection valve 4 being approximately 30 to 80 degrees. As a result, the injection valve 4 is inclined toward the axis of the cylinder at an angle greater than that of the adjacent intake valves 1.

If the internal combustion engine now runs in homogeneous lean-mixture operation, fuel is guided through the injection valve 4 into the fresh air flow S guided through the combustion chamber trough 6 and deflected by the step 7 during the intake stroke, at a crankshaft angle of approximately 440 to 280 degrees, before the piston 5 reaches top dead center. This results in a high relative velocity of fresh air and fuel, so that injection of a sufficient amount of fuel and homogeneous mixing of fresh air and fuel may take place in the shortest possible time.

If, on the other hand, the internal combustion engine runs in stratified lean-mixture operation, fuel facing the fresh air tumble flow S deflected by the step 7 is injected into the combustion chamber trough 6 through the injection valve 4 during the compression stroke at a crankshaft angle of approximately 120 to 30 degrees, before the piston 5 reaches upper dead center. The fresh air tumble flow S now causes the injected fuel to be stabilized inside the combustion chamber trough 6 near the injection valve 4 in an ignitable charge spray delivered by the subsequent compression movement of the piston 5 below the spark plug 3, so that the ignitable component of the mixture spray may be reached by a spark from the spark plug 3 mounted coaxially in the cylinder.

The oblong combustion chamber trough 6 extends for this purpose more or less in the direction of the vertical projection of an injection stream E emerging from the injection valve 4 onto the face of the piston 5. The step 7 extending crosswise to the oblong combustion chamber trough 6, possibly below the spark plug 3, divides the combustion chamber trough 6 into a first area 8 remote from the injection valve 4 and a second area 8' near the injection valve 4. The first area 8 remote from the injection valve 4 is deeper than the second area 8' near the injection valve 4. Both areas 8, 8' of the oblong combustion chamber trough 6 extend at a slight angle to the edge of the piston 5. In addition, the oblong combustion chamber trough 6 widens in the direction of the injection stream E and narrows in the direction of fresh air flow S so as to optimize the flow conditions. This enhances both the injection stream E and the fresh air flow S.

Lastly, the piston 5 is in the form of a roof, the step 7 of the combustion chamber trough 6 and the gable 9 of the rooflike piston 5 forming an approximately straight line. This form is coordinated with the reversing gas valves 1, 2 of the internal combustion engine, each of which is mounted so as to incline at an angle to the axis of the cylinder and permits design of an extremely compact combustion chamber.

In addition, FIG. 5 presents a top view of another piston 5', which is provided for a direct injection internal combustion engine with five reversing gas valves, that is, with three intake valves 1 and two exhaust valves 2. As a result, the injection valve 4 is mounted asymmetrically between one of the side intake valves 1 and the adjacent center intake valve 1, so that an oblique installed position is obtained. In this oblique installed position as well the oblong combustion chamber trough 6 extends more or less in the direction of the projection of an injection stream E emerging from the injection valve 4 onto the face of the piston 5'. Under this arrangement the longitudinal axis L of the first, symmetrically mounted, area 8 and the longitudinal axis L' of the second, asymmetrically mounted, area 8' in this instance enclose an acute angle β. This results from the circumstance that the first area 8 is coordinated with the fresh air flow S and the second area 8' with the injection stream E. The step 7 between the two areas 8, 8' extends more or less crosswise to the direction of the injection valve E and, respectively, parallel to the gable 9 of the rooflike piston 5'.

A sectional view of the piston 5 is shown in FIG. 6, section VI—VI extending along the longitudinal axis of the oblong combustion chamber trough 6. Consequently, step 7 extending more or less crosswise to the oblong combustion chamber trough 6 and dividing the combustion chamber trough 6 into first area 8 and second area 8' is perpendicular in section to the path of the trough. The illustration very clearly shows that a fin 10 more or less in the shape of a sawtooth in cross-section is formed on the step 7, the tip 11 of the sawtooth fin 10 in the combustion chamber facing the side of the intake valves 1 and respectively of the injection valve 4, and the back of the sawtooth fin 10 in the combustion chamber facing the opposite side of the exhaust valves 2.

In the embodiment example shown the back 12 of the sawtooth fin 10 has a radius R corresponding to approximately one-half the height of the fin 10 relative to the second area 8' of the combustion chamber trough 6. In this situation the back 12 of the fin 10 is displaced slightly relative to the axis of the cylinder, so that the back 12 is positioned a short distance from a spark plug 3 mounted coaxially with the piston 5 and accordingly in the cylinder. In addition, the path of the step 7 with the sawtooth fin on the side facing the first area 8 of the combustion chamber trough 6 is slightly concave.

In the embodiment example the injection valve 4 is mounted so as to incline at an angle 64 degrees to the axis of the cylinder. In the injection valve 4 shown the injection stream E emerges from the outlet with no bend, the outlet being mounted as far as possible from the axis of the cylinder.

Figure 8A:
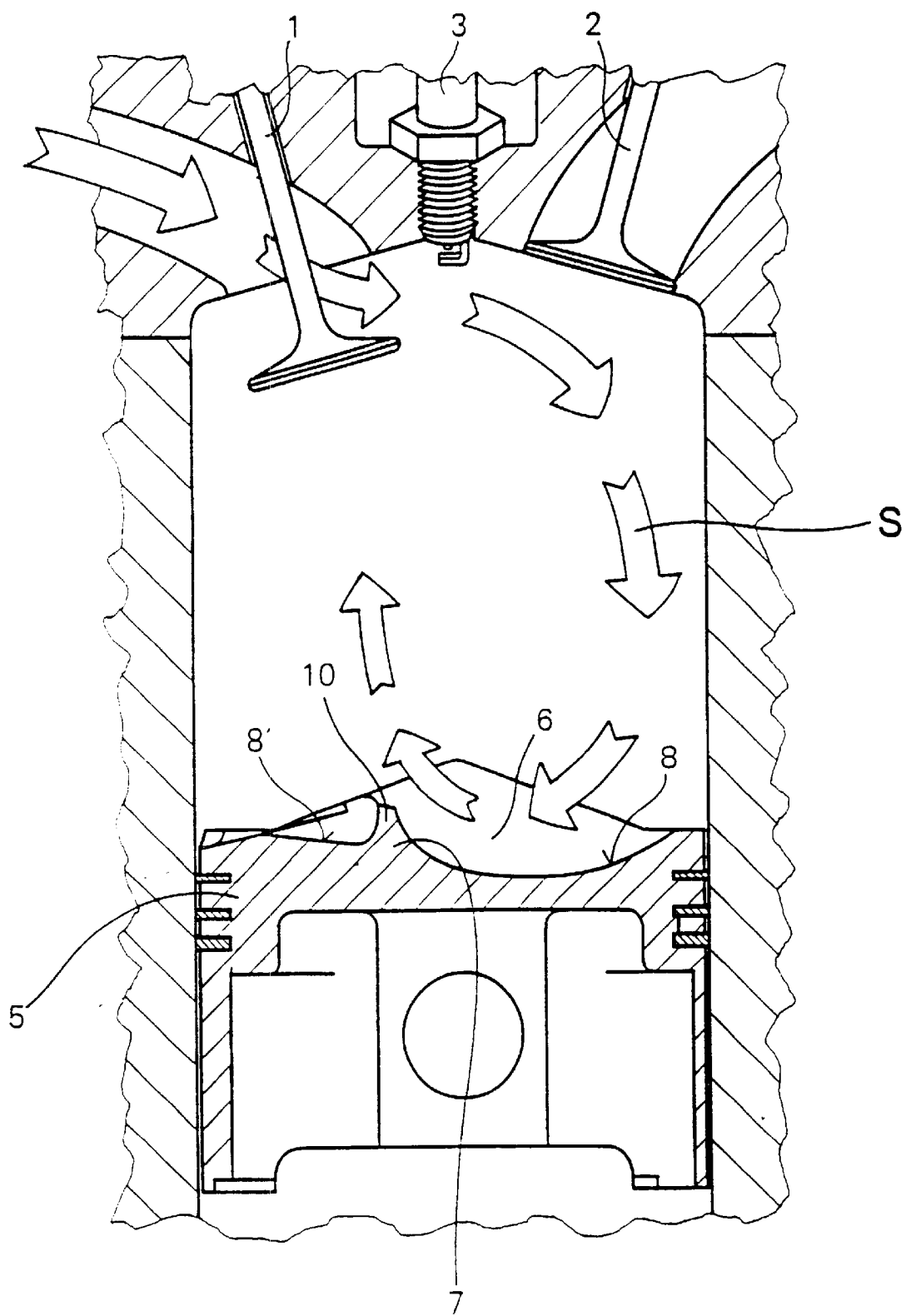

A simplified diagram of a combustion chamber of the internal combustion engine claimed for the invention is presented in FIG. 8a; the diagram corresponds to a snapshot taken at a crankshaft angle of approximately 180 degrees, that is, toward the end of the suction stroke. During the suction stroke fresh air flows through the intake openings controlled by the intake valves 1 into the combustion chamber of the internal combustion engine and is conducted past the roof of the combustion chamber and past the cylinder wall opposite the intake valves 1 into the first area 8 of the combustion chamber trough 6, which may also be designated as a "fresh air area."

The piston 5 moving upward during the subsequent compression stroke and the step 7 with fin 10 in the form of a sawtooth adjoining the first area 8 of the combustion chamber trough act to sustain the tumble flow S formed during the suction stroke for the time of the compression stroke and injection as well.

Figure 8B:
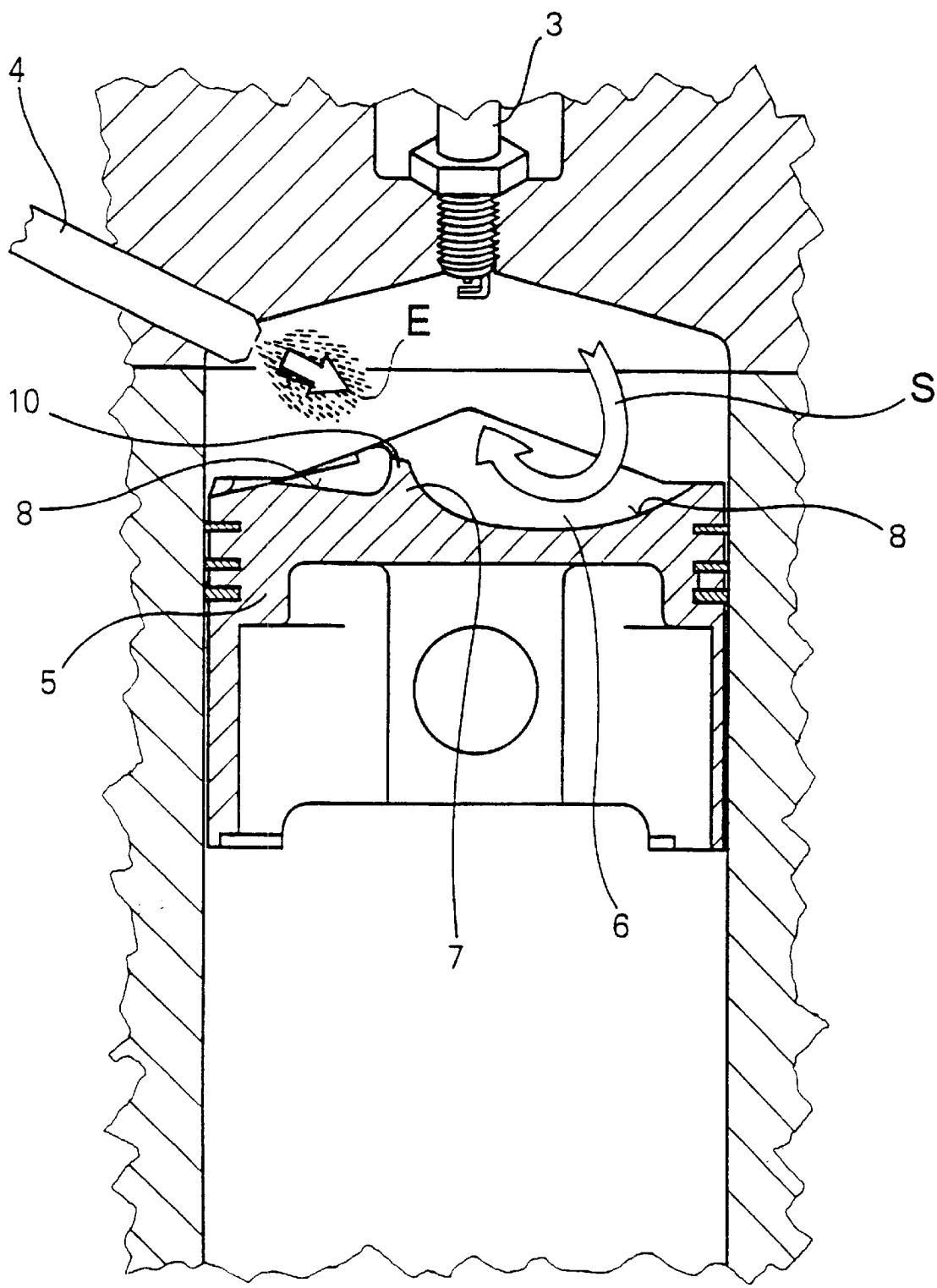
Figure 8C:
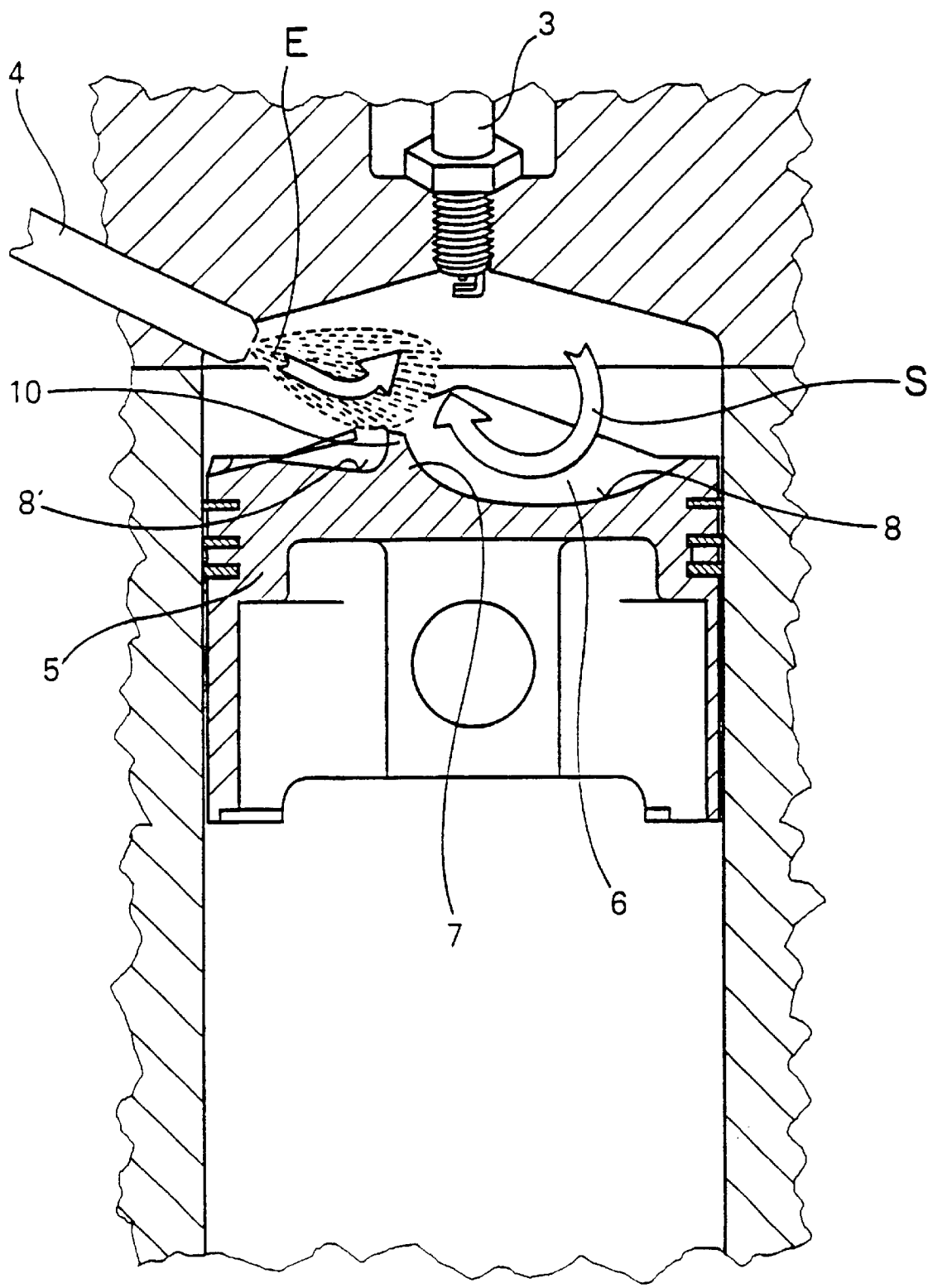
Figure 8D:
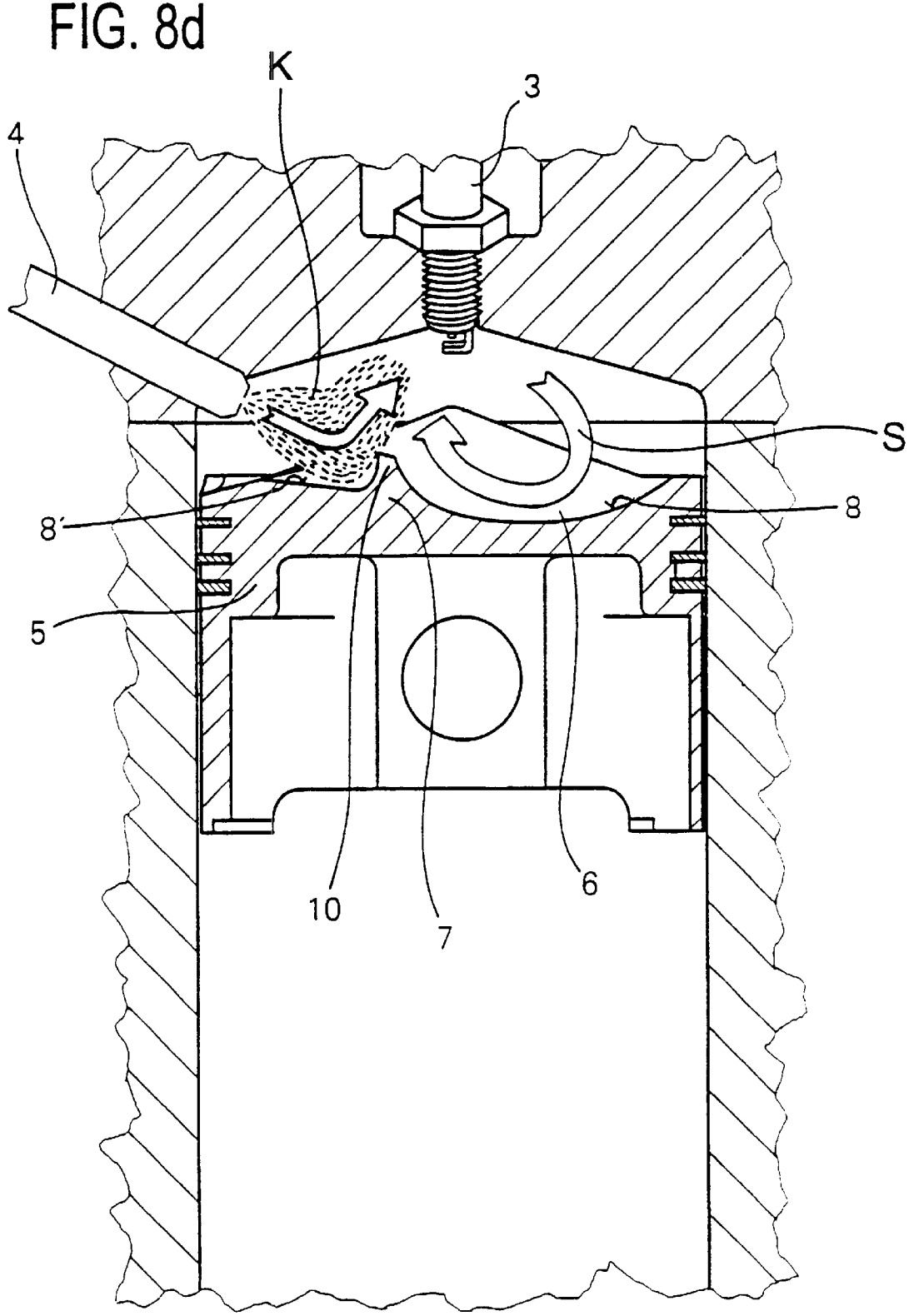
Figure 8E:
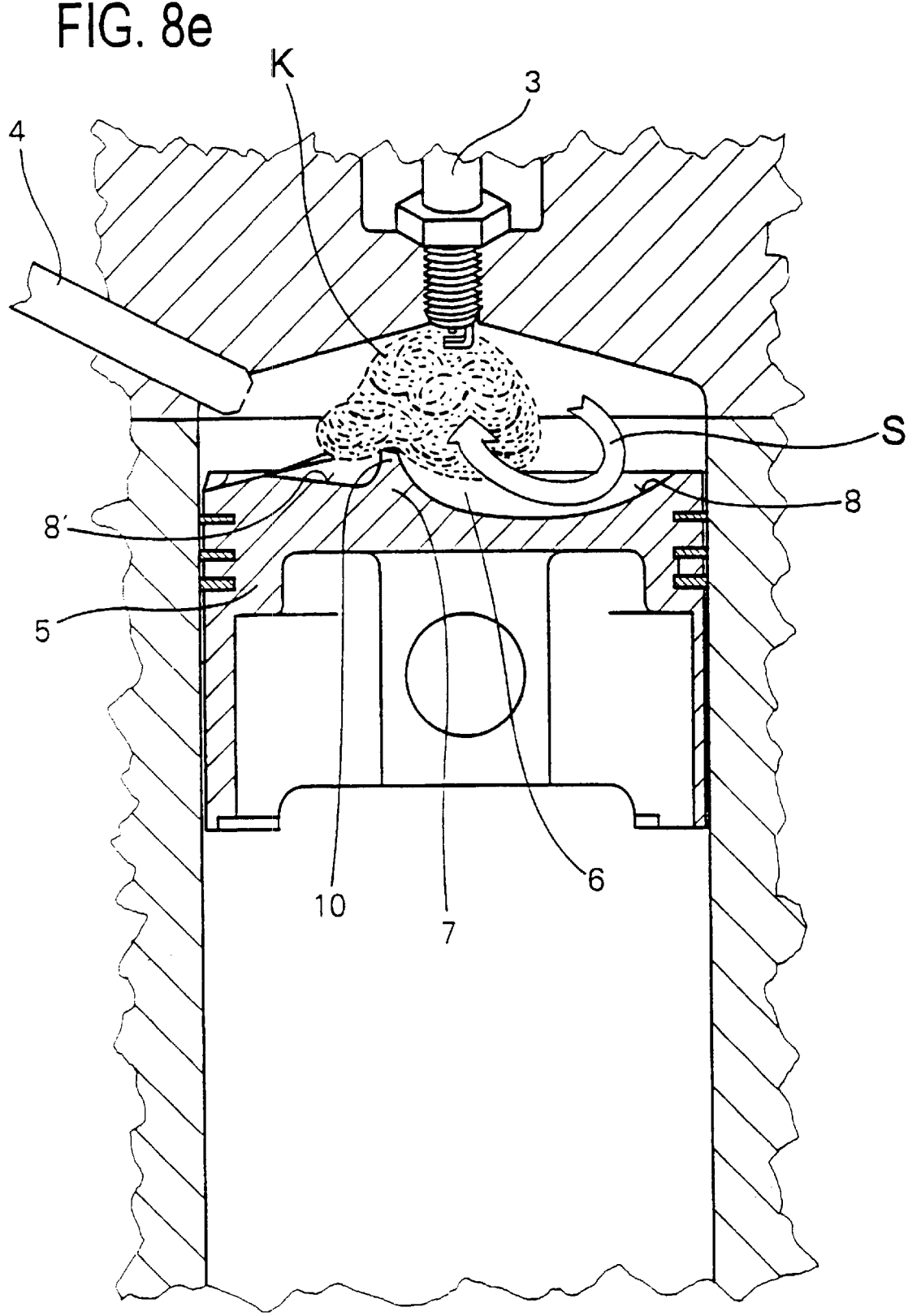
Figure 8G:
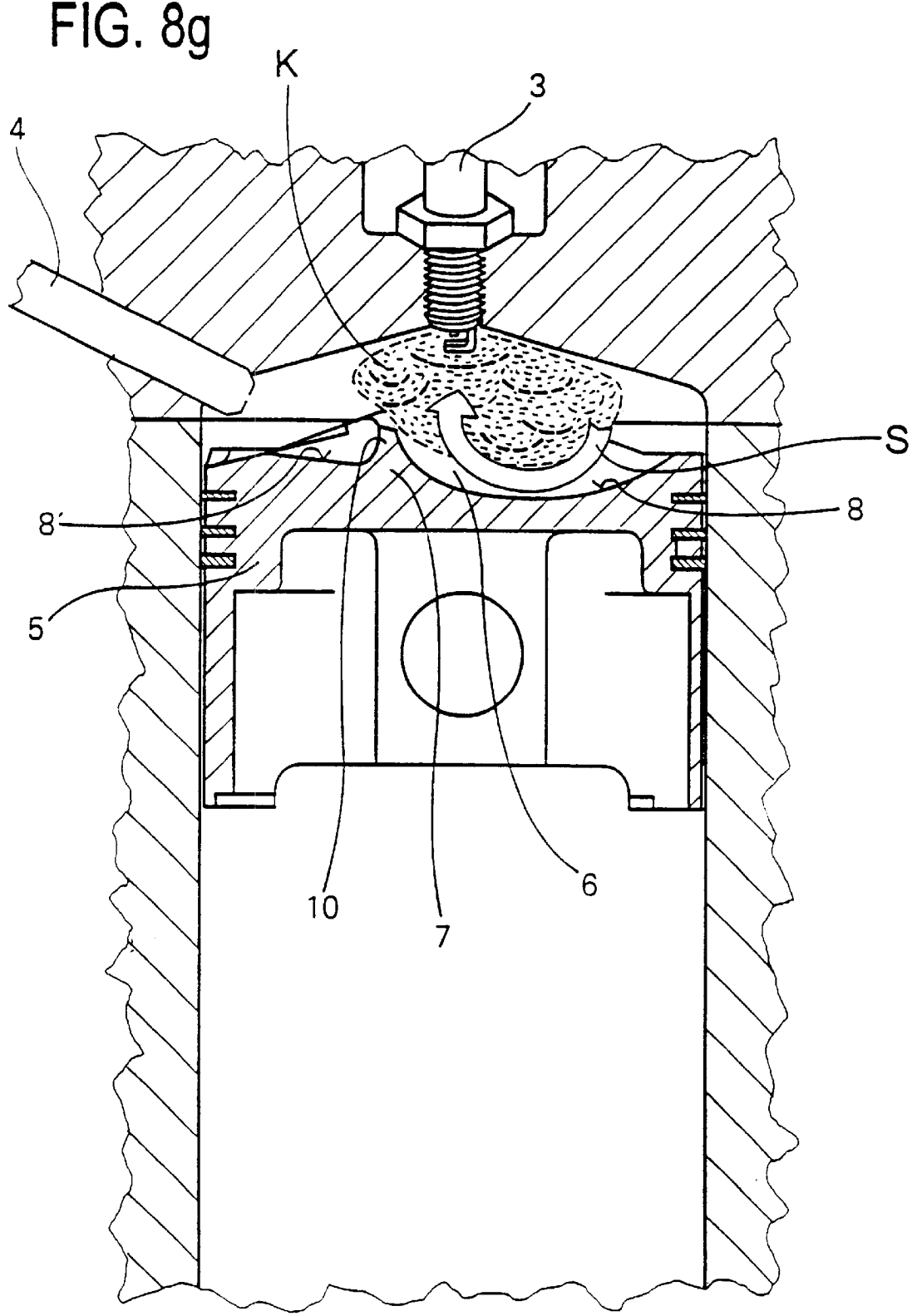
Figure 8H:
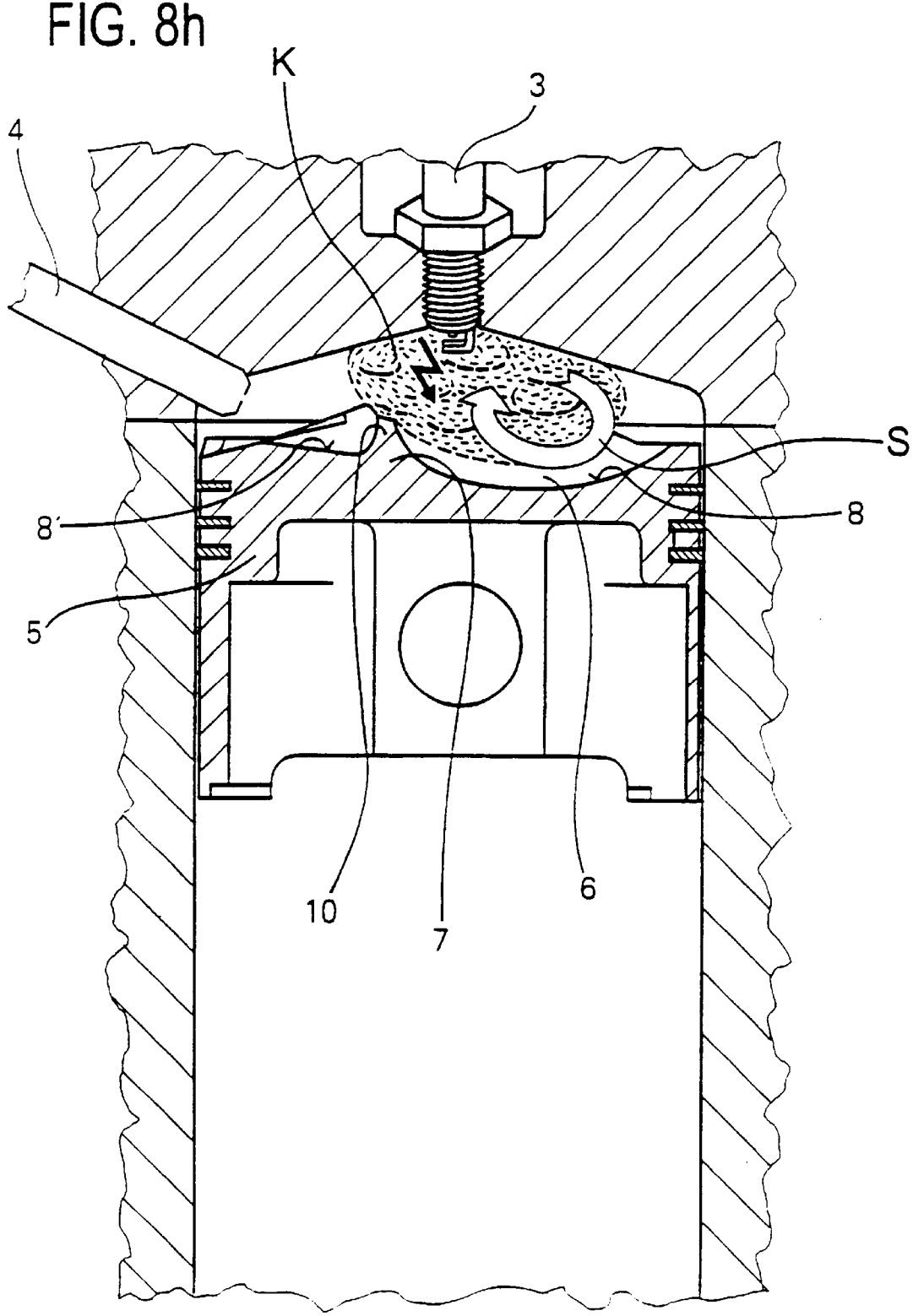

FIG. 8b presents the equivalent of a snapshot at a crankshaft angle of approximately 50 degrees, that is, during the compression stroke at the beginning of injection. In addition to the fresh air flow S rotating in tumble flow in the first area of the combustion chamber trough 6, a fuel stream E is injected here from the injection valve 4 in a straight line toward the second area 8' of the combustion chamber trough 6, which may also be designated as "fuel area." As is shown in FIGS. 8c and 8d, the injection stream E is subsequently deflected upward, toward the end of injection, by the step 7 with fin 10 in the direction of the spark plug 3, so that a fuel spray K is formed above the second area 8' of the combustion chamber trough 6 and accordingly above the fin 10.

At a crankshaft angle of approximately 35 to 30 degrees, that is, after injection has ended (see FIGS. 8e and 8f), the fuel spray K is forced by the injection pulse and by the fresh air tumble flow S in the direction of the roof of the combustion chamber and at the same time is also transported in the direction of the first area 8 of the combustion chamber trough 6, that is, toward the spark plug 3. The fuel spray K is subsequently mixed additionally with the fresh air tumble flow S (see FIG. 8g) and finally is ignited (see FIG. 8h).

A flow rate of approximately 3 to 6 meters per second should be maintained at least toward the end of the compression stroke in order for optimum ignition conditions to prevail below the spark plug 3 shortly before ignition.

What is claimed is:

1. A direct-injection internal combustion engine which has per cylinder at least two intake valves mounted side by side, a plurality of exhaust valves, a coaxial spark plug, an injection valve, and a piston, the injection valve (4) being mounted between two of the intake valves (1) mounted side by side and the section of the cylinder wall adjoining these intake valves (1), and the piston (5, 5') having an oblong combustion chamber trough (6) which extends in the direction of the vertical projection of an injection stream (E) emerging from the injection valve (4) onto the face of the piston (5, 5'), widening in the direction of the injection stream (E), and having a step (7) extending crosswise which divides the combustion chamber trough (6) into a first area (8) remote from the injection valve and second area (8') near the injection valve (4), the first area (8) of the combustion chamber trough (6) being deeper than the second area (8') and sloping toward the edge of the piston (5, 5').

2. An internal combustion engine as specified in claim 1, wherein the axes of the intake valves (1) are mounted parallel to each other and are spaced a maximum distance from each other.

3. An internal combustion engine as specified in claim 1, wherein the injection valve (4) inclines at an angle approximately 30 to 80 degrees to the axis of the cylinder and has a bend which deflects the injection stream (E) so that the center axis of the injection stream (E) is inclined at an angle approximately 45 to 70 degrees to the axis of the cylinder.

4. An internal combustion engine as specified in claim 1, wherein the injection valve (4) injects fuel into the cylinder during the exhaust or intake stroke at a crankshaft angle of approximately 440 to 280 degrees, before the piston (5, 5') reaches upper dead center.

5. An internal combustion engine as specified in claim 1, wherein the injection valve (4) injects fuel into the cylinder during the compression stroke at a crankshaft angle of approximately 120 to 30 degrees, before the piston (5, 5') reaches upper dead center.

6. An internal combustion engine as specified in claim 1, wherein the second area (8') of the combustion chamber trough (6) slopes toward the edge of the piston (5, 5').

7. An internal combustion engine as specified in claim 1, wherein a fin (10) which extends over the entire length of the step (7) is formed on the step (7).

8. An internal combustion engine as specified in claim 7, wherein the fin (10) is approximately in the form of a sawtooth in cross-section, the tip (11) of the sawtooth fin (10) pointing in the combustion chamber toward the side of the intake valves (1) or of the injection valve (4) and the curved back (12) of the sawtooth fin (10) pointing toward the side of the exhaust valves (2) and having a radius which corresponds to approximately one-half the height of the fin (10) relative to the second area (8') of the combustion chamber trough (6).

9. An internal combustion engine as specified in claim 7, wherein the step (7) with fin (10) extends below the spark plug (3).

10. An internal combustion engine as specified in claim 7, wherein the step (7) with fin (10) is mounted at a distance of ⅕ to ⅓ of the piston diameter (D) from the coaxial spark plug (3) and projects from the face of the piston (5).

11. An internal combustion engine as specified in claim 7, wherein the transition from the step (7) with fin (10) to the first area (8) of the combustion chamber trough (6) extends at an angle approximately 2 to 30 degrees to the axis of the cylinder and the path of the step (7) with fin (10) on the side facing the first area (8) of the combustion chamber trough (6) is slightly concave.

12. An internal combustion engine as specified in claim 7, wherein the first area (8) of the combustion chamber trough (6) near the step (7) with fin (10) is wider than the fin (10) and wherein the disks of the exhaust valves (2) travel into the first area (8) of the combustion chamber trough (6).

13. An internal combustion engine as specified in claim 7, wherein the outlet opening of the injection valve (4) is positioned in advance of the fin (10) opposite the first area (8) and remote from the axis of the cylinder.

14. A process for mixture preparation in a direct injection internal combustion engine, wherein the fresh air drawn in a combustion chamber forms a tumble flow (S) which near the edge of a piston (5, 5') enters a first area (8) of a combustion chamber trough (6), is accelerated by a narrowing of first area (8) toward the center of the piston (5, 5'), and, lastly, is deflected by a step (7) in the direction of a spark plug (3).

15. A process as specified in claim 14, wherein, in stratified lean-mixture operation, fresh air flows into the combustion chamber during the suction stroke and moves through the first area (8) of the combustion chamber trough (6) as a tumble flow (S) which is sustained during the compression stroke and injection by a fin (10) above the first area (8) of the combustion chamber trough (6).

16. A process as specified in claim 14, wherein, in stratified lean-mixture operation, fuel from the injection valve (4) is injected during the compression stroke into the fresh air flowing through the first area (8) of the combustion chamber trough (6) as tumble flow (S), initially in a straight line in the direction of a second area (8') of the combustion chamber trough (6), and then is deflected by the step (7) with a sawtooth fin (10) in the direction of the spark plug (3), forming a fuel spray (K) above the second area (8') of the combustion chamber trough (6) and accordingly above the step (7) with sawtooth fin (10), wherein such fuel spray (K) is maintained by the tumble flow (S), is transported in the direction of the spark plug (3) and mixed with fresh air.

* * * * *

UNITED STATES PATENT AND TRADEMARK OFFICE
CERTIFICATE OF CORRECTION

PATENT NO. : 6,378,490 B1
DATED : April 30, 2002
INVENTOR(S) : Alfred Ottowitz et al.

It is certified that error appears in the above-identified patent and that said Letters Patent is hereby corrected as shown below:

<u>Title page,</u>
Please delete the following paragraph:
Item "[22] Filed: August 16, 2000"
In lieu thereof, please insert the following information:
-- [22] PCT Filed: March 2, 1999
  [86] PCT No.: PCT/EP99/01345
     Section 371(c)(1), (2), (4) Date: Oct. 4, 2000
  [87] PCT Pub. No.: WO99/45249
     PCT Pub. Date: Sept. 10, 1999 --

[30] Foreign Application Priority Data
     Mar. 4, 1998 (DE)........................... 198 09 066.6
     Aug. 13, 1998 (DE).......................... 198 36 707.4 --

<u>Column 1,</u>
Line 3, insert the following paragraph:
-- This application is the United States national application corresponding to International Application No. PCT/EP99/01345, filed March 2, 1999 and designating the United States. --

Signed and Sealed this

Twelfth Day of November, 2002

Attest:

Attesting Officer

JAMES E. ROGAN
*Director of the United States Patent and Trademark Office*